(12) United States Patent
Tischhauser et al.

(10) Patent No.: US 7,880,968 B1
(45) Date of Patent: Feb. 1, 2011

(54) TUNABLE MICHELSON AND MACH-ZEHNDER INTERFEROMETERS MODIFIED WITH GIRES-TOURNOIS INTERFEROMETERS

(75) Inventors: Christopher W. Tischhauser, San Mateo, CA (US); James E. Mason, Palo Alto, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 12/695,117

(22) Filed: Jan. 27, 2010

Related U.S. Application Data

(62) Division of application No. 12/200,627, filed on Aug. 28, 2008, now Pat. No. 7,679,755, which is a division of application No. 11/499,725, filed on Aug. 7, 2006, now Pat. No. 7,433,054.

(60) Provisional application No. 60/801,049, filed on May 18, 2006.

(51) Int. Cl.
G01B 9/02 (2006.01)
G02B 27/10 (2006.01)

(52) U.S. Cl. .................... 359/618; 356/519

(58) Field of Classification Search ............. 356/491, 356/519, 451, 452, 454; 359/618, 278
See application file for complete search history.

(56) References Cited

U.S. PATENT DOCUMENTS

| | | |
|---|---|---|
| 6,169,604 B1 | 1/2001 | Cao |
| 6,169,626 B1 | 1/2001 | Chen et al. |
| 6,252,716 B1 | 6/2001 | Paiam |
| 6,304,689 B1 | 10/2001 | Dingel et al. |
| 6,683,721 B2 | 1/2004 | Copner et al. |
| 6,765,679 B2 | 7/2004 | Ducellier et al. |
| 6,867,868 B1 | 3/2005 | Barbarossa |
| 6,909,511 B2 | 6/2005 | Copner et al. |
| 2003/0077019 A1 | 4/2003 | Sano et al. |

*Primary Examiner*—Haw S. A Lee
(74) *Attorney, Agent, or Firm*—McDermott Will & Emery LLP

(57) ABSTRACT

Optical filters tunable for both center wavelength and bandwidth, having applications such as in astronomy, remote sensing, laser spectroscopy, and other laser-based sensing applications, using Michelson interferometers or Mach-Zehnder interferometers modified with Gires-Tournois interferometers ("GTIs") are disclosed. A GTI nominally has unity magnitude reflectance as a function of wavelength and has a phase response based on its resonator characteristics. Replacing the end mirrors of a Michelson interferometer or the fold minors of a Mach-Zehnder interferometer with GTIs results in both high visibility throughput as well as the ability to tune the phase response characteristics to change the width of the bandpass/notch filters. A range of bandpass/bandreject optical filter modes, including a Fabry-Perot ("FP") mode, a wideband, low-ripple FP mode, a narrowband notch/bandpass mode, and a wideband notch/bandpass mode, are all tunable and wavelength addressable.

5 Claims, 10 Drawing Sheets

TUNABLE MICHELSON AND MACH-ZEHNDER INTERFEROMETERS MODIFIED WITH GIRES-TOURNOIS INTERFEROMETERS

CROSS-REFERENCES TO RELATED APPLICATIONS

This application is a divisional application of U.S. patent application Ser. No. 12/200,627, filed on Aug. 28, 2008, which is a divisional application of U.S. patent application Ser. No. 11/499,725, filed on Aug. 7, 2006, which claims the benefit of priority under 35 U.S.C. §119 of U.S. Provisional Patent Application Ser. No. 60/801,049 entitled "TUNABLE PHASE DISPERSION MICHELSON INTERFEROMETER," filed on May 18, 2006, all of which are hereby incorporated by reference in their entirety for all purposes.

STATEMENT AS TO RIGHTS TO INVENTIONS MADE UNDER FEDERALLY SPONSORED RESEARCH OR DEVELOPMENT

Not Applicable.

FIELD

The present invention generally relates to optical filters and interferometers and, in particular, relates to tunable Michelson interferometers and Mach-Zehnder interferometers modified with Gires-Tournois interferometers ("GTIs").

BACKGROUND

As optical filters, simple Michelson interferometers and Mach-Zehnder interferometers suffer from a lack of flexibility in their bandwidth characteristics. The bandwidth is a function of the differential optical path dispersion, which is fixed by the optical path, and has limited tunability. It is therefore considered highly desirable to provide for modified Michelson or Mach-Zehnder interferometers that overcome the deficiencies of conventional interferometers, by allowing the wavelength and bandwidth of these devices tunable.

SUMMARY

The present invention relates to optical filters tunable for both center wavelength and bandwidth, having applications such as in astronomy, remote sensing laser spectroscopy, and other laser-based sensing applications, using Michelson interferometers or Mach-Zehnder interferometers modified with Gires-Tournois interferometers ("GTIs"). A GTI nominally has unity magnitude reflectance as a function of wavelength and has a phase response based on its resonator characteristics. Replacing the end mirrors of a Michelson interferometer or the fold mirrors of a Mach-Zehnder interferometer with GTIs results in both high visibility throughput as well as the ability to tune the phase response characteristics to change the width of the bandpass/notch filters. A range of bandpass/bandreject optical filter modes, including a Fabry-Perot ("FP") mode, a wideband, low-ripple FP mode, a narrowband notch/bandpass mode, and a wideband notch/bandpass mode, are all tunable and wavelength addressable in accordance with aspects of the present invention.

In accordance with one embodiment of the present invention, an optical filter includes a Michelson interferometer or a Mach-Zehnder interferometer having a first optical path length $L_1$ and a second optical path length $L_2$, the Michelson interferometer or the Mach-Zehnder interferometer further having a plurality of GTIs replacing a plurality of mirrors of the Michelson interferometer or the Mach-Zehnder interferometer, a first one of the plurality of GTIs having a first GTI spacing $d_1$, a second one of the plurality of GTIs having a second GTI spacing $d_2$, wherein a filter function $$H = \sin^2\left(\frac{\phi}{2}\right)$$

or $$H = \cos^2\left(\frac{\phi}{2}\right),$$

a phase difference $$\phi = \phi_{arm1} - \phi_{arm2}, \phi_{arm1} = 2\pi\frac{L_1}{\lambda} + \phi_{GTI1}, \phi_{arm2} = 2\pi\frac{L_2}{\lambda} + \phi_{GTI2},$$

$$\phi_{GTI1} = 2\arctan\left(\frac{1-\rho_1}{1+\rho_1}\tan\left(\frac{2\pi d_1}{\lambda}\right)\right), \phi_{GTI2} = 2\arctan\left(\frac{1-\rho_2}{1+\rho_2}\tan\left(\frac{2\pi d_2}{\lambda}\right)\right),$$

$\lambda$ is a wavelength of an input beam, $\rho_1$ is an amplitude reflectivity of a mirror of the first one of the plurality of GTIs, and $\rho_2$ is an amplitude reflectivity of a mirror of the second one of the plurality of GTIs, wherein an optical path difference $\Delta L = L_1 - L_2 = 0$, $d_1 = (2n_{GTI\,1}-1)(\lambda_{target}/4)$, and $d_2 = 0$, wherein $\lambda_{target}$ is a target wavelength, and $n_{GTI\,1}$ is an integer greater than zero.

In accordance with one embodiment of the present invention, an optical filter includes a Michelson interferometer or a Mach-Zehnder interferometer having a first optical path length $L_1$ and a second optical path length $L_2$, the Michelson interferometer or the Mach-Zehnder interferometer further having a plurality of GTIs replacing a plurality of mirrors of the Michelson interferometer or the Mach-Zehnder interferometer, a first one of the plurality of GTIs having a first GTI spacing $d_1$, a second one of the plurality of GTIs having a second GTI spacing $d_2$, wherein an optical path difference $\Delta L = L_1 - L_2 = 0$, $d_1 = (2n_{GTI\,1}-1)(\lambda_{target1}/4)$, and $d_2 = (2n_{GTI\,2}-1)(\lambda_{target\,2}/4)$, wherein $\lambda_{target1}$ is a target wavelength of the first one of the plurality of GTIs, $n_{GTI\,1}$ is an integer greater than zero, $\lambda_{target\,2}$ is a target wavelength of the second one of the plurality of GTIs, $n_{GTI\,2}$ is an integer greater than zero, and $n_{GTI\,1}$ is either the same or different from $n_{GTI\,2}$.

In accordance with one embodiment of the present invention, an optical filter includes a Michelson interferometer or a Mach-Zehnder interferometer having a first optical path length $L_1$ and a second optical path length $L_2$, the Michelson interferometer or the Mach-Zehnder interferometer further having a plurality of GTIs replacing a plurality of mirrors of the Michelson interferometer or the Mach-Zehnder interferometer, a first one of the plurality of GTIs having a first GTI spacing $d_1$, a second one of the plurality of GTIs having a second GTI spacing $d_2$, and an optical path difference $\Delta L = L_1 - L_2$, wherein $\Delta L = 2n_M(\lambda_{target\,1}/2)$ or $\Delta L = (2n_M-1)(\lambda_{target\,1}/2)$, $d_1 = (2n_{GTI\,1}-1)(\lambda_{target\,1}/4)$, and $d_2 = 0$, wherein $\lambda_{target\,1}$ is a target wavelength, $n_M$ is an integer greater than zero, and $n_{GTI\,1}$ is an integer greater than zero.

In accordance with one embodiment of the present invention, an optical filter includes a Michelson interferometer or a Mach-Zehnder interferometer having a first optical path length $L_1$ and a second optical path length $L_2$, the Michelson interferometer or the Mach-Zehnder interferometer further having a plurality of GTIs replacing a plurality of mirrors of the Michelson interferometer or the Mach-Zehnder interferometer, a first one of the plurality of GTIs having a first GTI spacing $d_1$, a second one of the plurality of GTIs having a second GTI spacing $d_2$, and an optical path difference $\Delta L = L_1 - L_2$, wherein $\Delta L = (2n_M - 1)(\lambda_{target\ 1}/2)$ or $\Delta L = 2n_M (\lambda_{target\ 1}/2)$, $d_1 = 2n_{GTI\ 1}(\lambda_{target\ 1}/4)$, and $d_2 = 0$, wherein $\lambda_{target\ 1}$ is a target wavelength, $n_M$ is an integer greater than zero, and $n_{GTI\ 1}$ is an integer greater than zero.

Additional features and advantages of the invention will be set forth in the description below, and in part will be apparent from the description, or may be learned by practice of the invention. The objectives and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings.

DETAILED DESCRIPTION

In the following detailed description, numerous specific details are set forth to provide a full understanding of the present invention. It will be obvious, however, to one ordinarily skilled in the art that the present invention may be practiced without some of these specific details. In other instances, well-known structures and techniques have not been shown in detail not to obscure the present invention.

The present invention can be used in a large variety of applications, such as filters, Fourier Transform Spectroscopy devices, imagers, and microscopy devices. The present invention relates to Michelson and Mach-Zehnder interferometers in which the high reflecting end mirrors of a Michelson interferometer or the fold mirrors of a Mach-Zehnder interferometer are replaced with Gires-Tournois interferometers ("GTIs"). A GTI may be a version of a Fabry-Perot ("FP") resonator in which the back mirror has ideally unity reflectance. This forms a cavity in which the reflectance is ideally unity, but the phase dispersion is a function of wavelength like an ordinary resonator. Since the GTIs are high reflectors, the high visibility of a Michelson or Mach-Zehnder interferometer is retained, and by using the resonator phase dispersion of the GTIs, the filter characteristics of an ordinary Michelson or Mach-Zehnder interferometer can be modified to generate a wide range of functions.

According to one arrangement, the present invention is a method to modify the relative phase characteristics of the two arms of an interferometer, which allows the spectral characteristics of the device to be made tunable, thus increasing the utility of the device.

Structures

Figure 1:
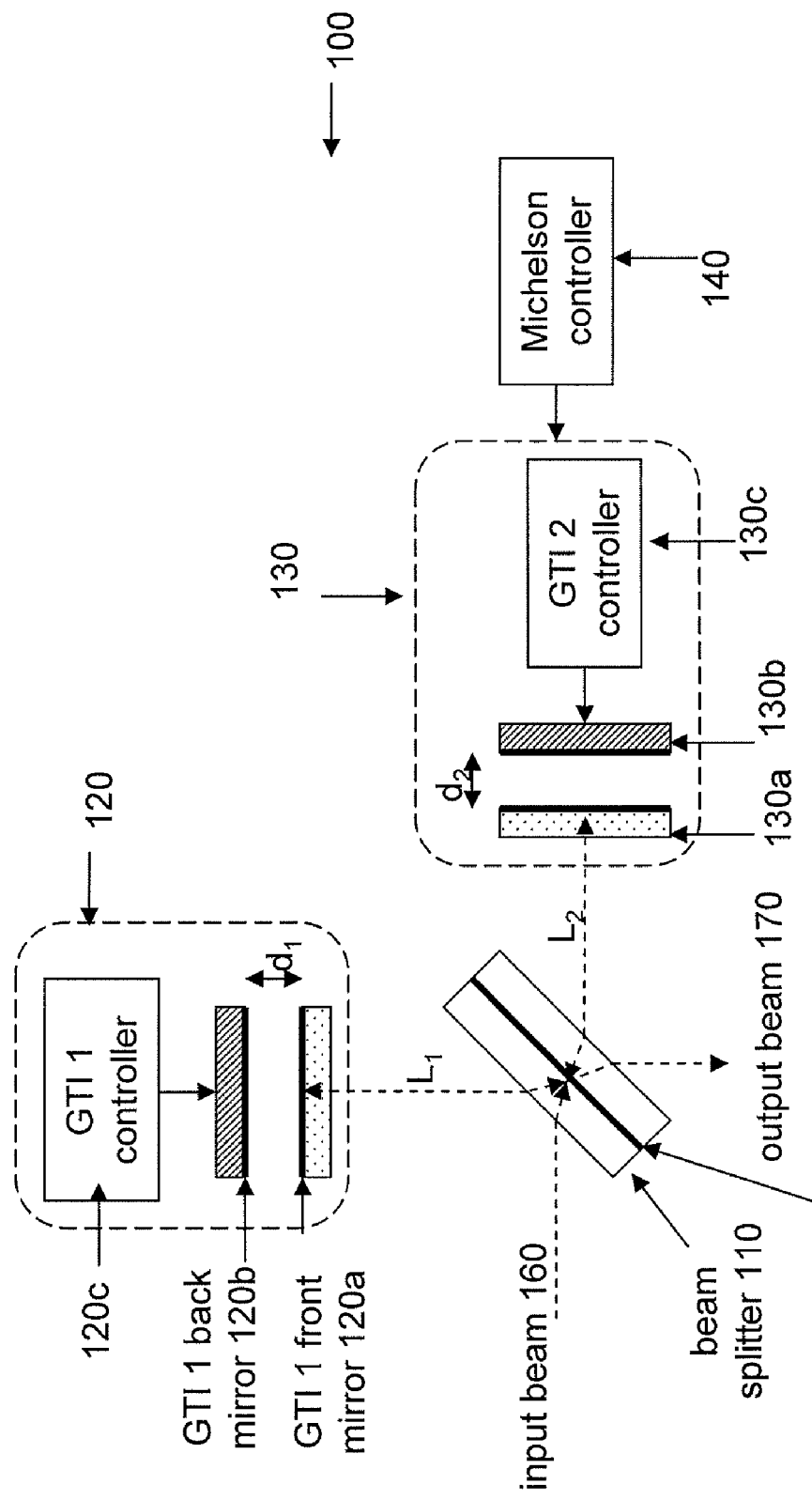
FIG. 1 is a block diagram of a Michelson interferometer having dual Gires-Tournois interferometers ("GTIs") with a phase-symmetric beam splitter in accordance with one embodiment of the present invention.

Now referring to FIG. 1, a simplified diagram of a Michelson interferometer having dual GTIs with a phase-symmetric beam splitter is illustrated in accordance with one embodiment of the present invention. An optical filter 100 includes a beam splitter 110, a first GTI ("GTI 1") 120, a second GTI ("GTI 2") 130, and a Michelson controller 140. GTI 1 120 and GTI 2 130 replace two reflecting end mirrors of a simple Michelson interferometer. GTI 1 120 includes a GTI 1 front mirror 120a, a GTI 1 back mirror 120b and a GTI 1 controller 120c. GTI 2 130 includes a GTI 2 front mirror 130a, a GTI 2 back mirror 130b and a GTI 2 controller 130c. An input beam 160 from an input port incident on the beam splitter 110 splits and travels to the GTI 1 120 and GTI 2 130. The beams from the GTI 1 120 and GTI 2 130 travel back to the beam splitter 110 and are re-combined to produce an output beam 170 at an output port.

$L_1$ is a round-trip optical path length of a first arm of the optical filter 100 (i.e., the sum of the optical path length from a reflection surface 115 of the beam splitter 110 to the GTI 1 120 and the return optical path length from the GTI 1 120 back to the reflection surface 115 of the beam splitter 110). $L_2$ is a round-trip optical path length of a second arm of the optical filter 100 (i.e., the sum of the optical path length from a reflection surface 115 of the beam splitter 110 to the GTI 2 130 and the return optical path length from the GTI 2 130 back to the reflection surface 115 of the beam splitter 110). An optical path difference $\Delta L$ is the difference between $L_1$ and $L_2$.

The optical filter 100 is sometimes referred to as a type of dual GTI Michelson ("DGTIM") interferometer. The phase shift is the same on both sides of the beam splitter 110. This type of filter generates a bright fringe at zero optical path length delay.

Figure 2:
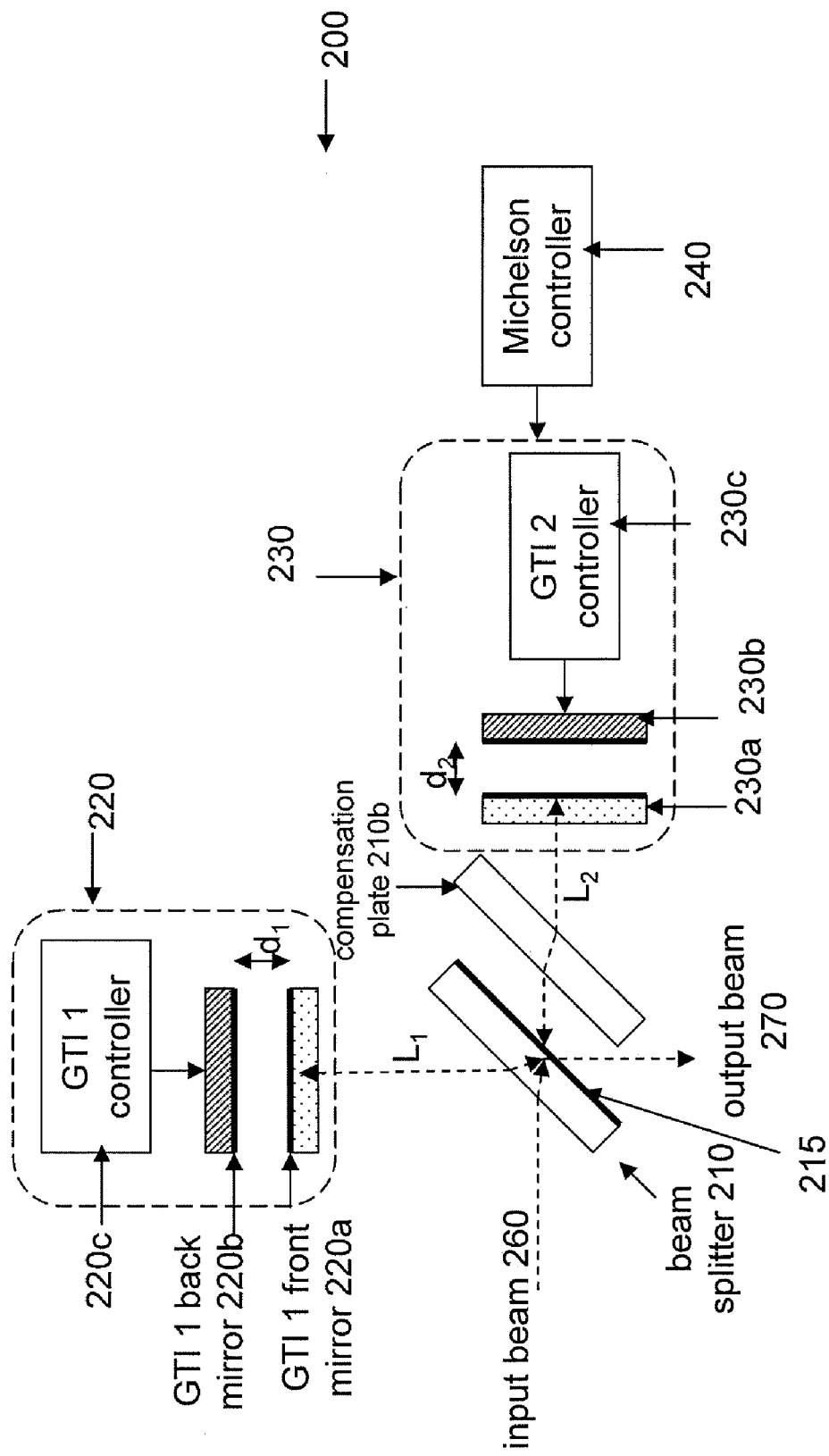
FIG. 2 is a block diagram of a Michelson interferometer having dual GTIs with a phase-asymmetric beam splitter in accordance with one embodiment of the present invention.

FIG. 2 is a block diagram of a Michelson interferometer having dual GTIs with a phase-asymmetric beam splitter in accordance with one embodiment of the present invention. An optical filter 200 includes a beam splitter 210, a compensation plate 210b, GTI 1 220, GTI 2 230, and a Michelson controller 240. GTI 1 220 and GTI 2 230 replace two reflecting end mirrors of a simple Michelson interferometer. GTI 1 220 includes a GTI 1 front mirror 220a, a GTI 1 back mirror 220b and a GTI 1 controller 220c. GTI 2 230 includes a GTI 2 front mirror 230a, a GTI 2 back mirror 230b and a GTI 2 controller 230c. An input beam 260 from an input port incident on the beam splitter 210 splits and travels to the GTI 1 220 and GTI 2 230. The beams from the GTI 1 220 and GTI 2 230 travel back to the beam splitter 210 and are re-combined to produce an output beam 270 at an output port. The beam traveling to the GTI 2 230 and the beam traveling from the GTI 2 230 pass through the compensation plate 210b.

$L_1$ is a round-trip optical path length of a first arm of the optical filter 200 (i.e., the sum of the optical path length from a reflection surface 215 of the beam splitter 210 to the GTI 1 220 and the return optical path length from the GTI 1 220 back to the reflection surface 215 of the beam splitter 210). $L_2$ is a round-trip optical path length of a second arm of the optical filter 200 (i.e., the sum of the optical path length from a reflection surface 215 of the beam splitter 210 to the GTI 2 230 through the compensation plate 210b and the return optical path length from the GTI 2 230 back to the reflection surface 215 of the beam splitter 210 through the compensation plate 210b). An optical path difference $\Delta L$ is the difference between $L_1$ and $L_2$.

The optical filter 200 is sometimes referred to as a type of dual GTI Michelson ("DGTIM") interferometer. In the optical filter 200, a $\pi$ phase shift difference exists between the amplitude reflectivities of the two sides of the beam splitter 210. This type of filter generates a dark fringe at zero path length delay.

Figure 3:
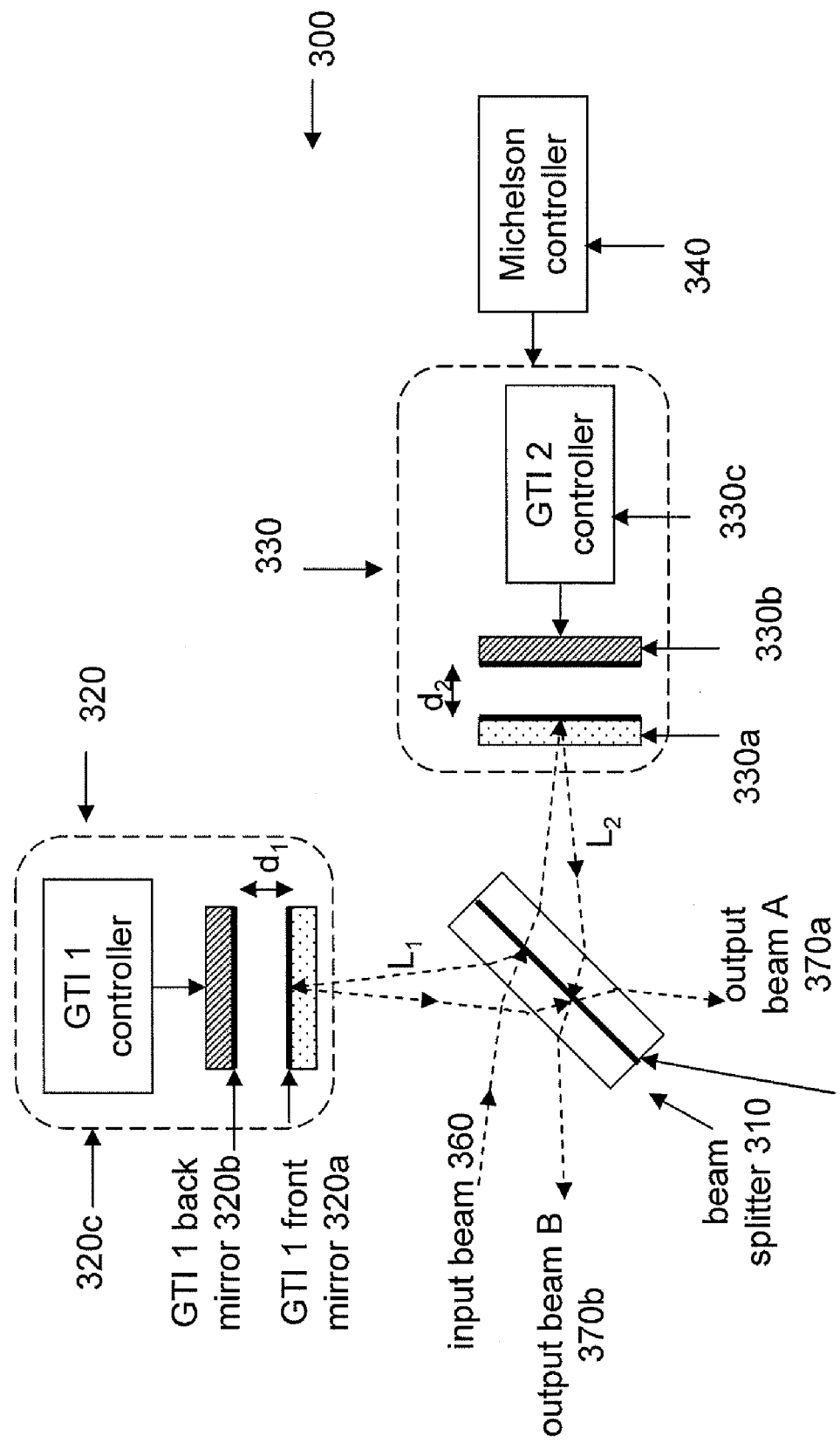
FIG. 3 is a block diagram of a Michelson interferometer having dual GTIs with an off-axis beam splitter in accordance with one embodiment of the present invention.

FIG. 3 is a block diagram of a Michelson interferometer having dual GTIs with an off-axis beam splitter in accordance with one embodiment of the present invention. An optical filter 300 includes a beam splitter 310, GTI 1 320, GTI 2 330, and a Michelson controller 340. GTI 1 320 and GTI 2 330 replace two reflecting end mirrors of a simple Michelson interferometer. GTI 1 320 includes a GTI 1 front mirror 320a, a GTI 1 back mirror 320b and a GTI 1 controller 320c. GTI 2 330 includes a GTI 2 front mirror 330a, a GTI 2 back mirror 330b and a GTI 2 controller 330c. An input beam 360 from an input port incident on the beam splitter 310 splits and travels to the GTI 1 320 and GTI 2 330. The beams from the GTI 1 320 and GTI 2 330 travel back to the beam splitter 310 and are re-combined to produce two output beams—an output beam A 370a at a first output port and an output beam B 370b at a second output port. The optical filter 300 is sometimes referred to as a type of dual GTI Michelson ("DGTIM") interferometer.

$L_1$ is a round-trip optical path length of a first arm of the optical filter 300 (i.e., the sum of the optical path length from a reflection surface 315 of the beam splitter 310 to the GTI 1 320 and the return optical path length from the GTI 1 320 back to the reflection surface 315 of the beam splitter 310). $L_2$ is a round-trip optical path length of a second arm of the optical filter 300 (i.e., the sum of the optical path length from a reflection surface 315 of the beam splitter 310 to the GTI 2 330 and the return optical path length from the GTI 2 330 back to the reflection surface 315 of the beam splitter 310). An optical path difference $\Delta L$ is the difference between $L_1$ and $L_2$.

In FIG. 3, the beam splitter 310 is off-axis, and thus the optical path from the beam splitter 310 to GTI 1 320 does not coincide with the return optical path from the GTI 1 320 to the beam splitter 310, and the optical path from the beam splitter 310 to GTI 2 330 does not coincide with the return optical path from the GTI 2 330 to the beam splitter 310. This allows the return output port of the optical filter 300 (i.e., the port for the output beam B 370b) to be accessible.

The filter characteristics of the output beam 270 of FIG. 2 are reciprocal of or complementary to the filter characteristics of the output beam 170 of FIG. 1. Furthermore, the filter characteristics of the output beam A 370a of FIG. 3 are the same as the filter characteristics of the output beam 170 of FIG. 1, and the filter characteristics of the output beam B 370b of FIG. 3 are the same as the filter characteristics of the output beam 270 of FIG. 2 or are reciprocal of or complementary to the filter characteristics of the output beam 170 of FIG. 1.

According to one aspect of the present invention, if there is a field of view (such as if used in imaging applications), there will be special field effects which may be non-negligible. In certain cases, the filter bandwidth can be narrowed using lower order settings (i.e., lower $n_M$, as described later) than the order settings required by a simple Michelson interferometer. This corresponds to a smaller optical path difference $\Delta L$, which leads to a larger field of view, since field of view effects scale inversely with the optical path difference $\Delta L$.

According to another aspect of the present invention, two GTIs give better visibility in the case where the mirror coatings are lossy or the reflectance is not unity (e.g., metallic coatings). In a GTI, lossy coatings cause significant amplitude variations between on and off resonance. Amplitude variations between arms of an optical filter will reduce the visibility, limiting the filter performance.

It should also be noted that for imaging applications or other applications where wavefront quality is required, the optical filter should be placed in a collimated space (i.e., an input beam should be a collimated light).

Figure 4:
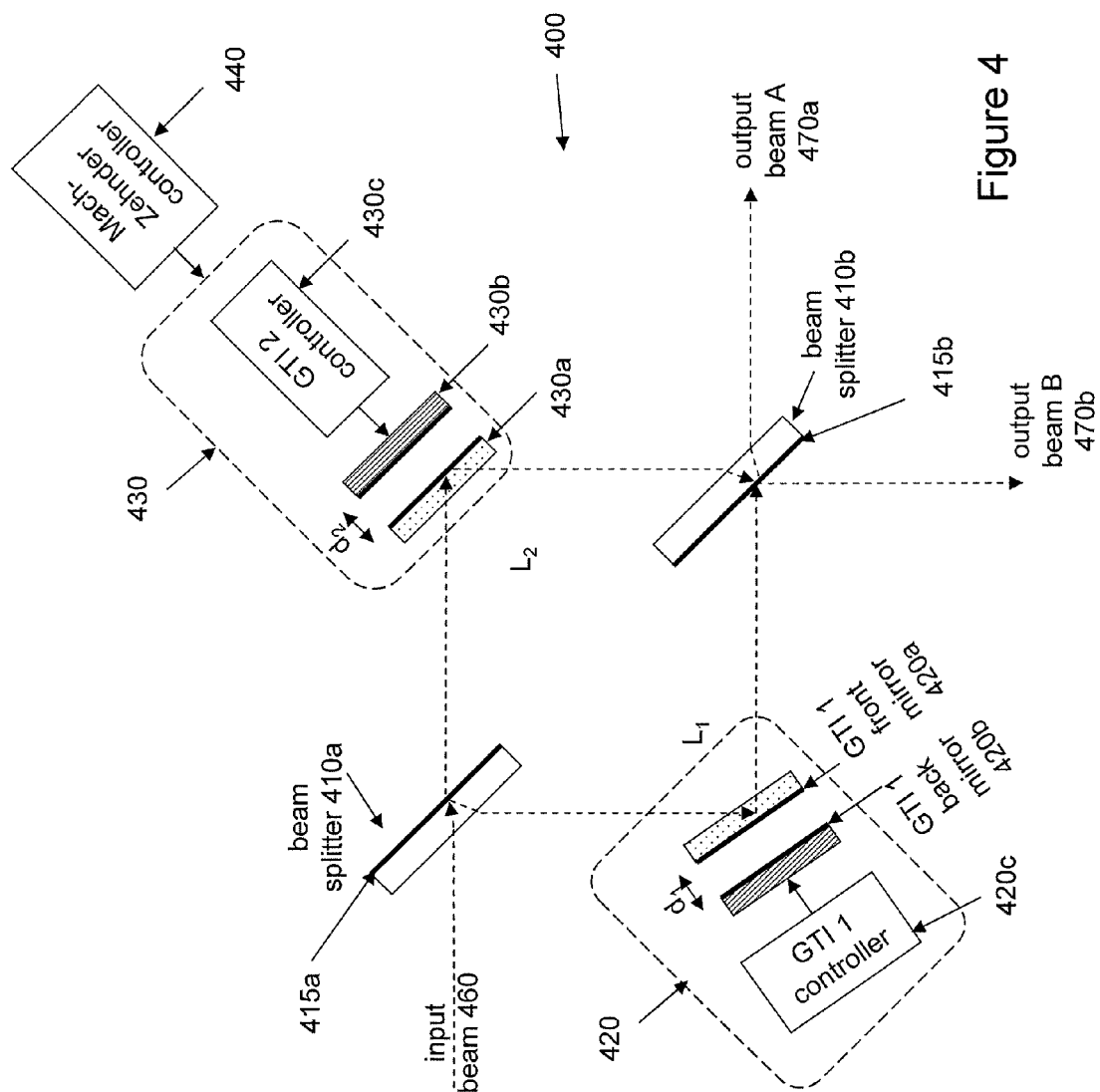
FIG. 4 is a block diagram of a Mach-Zehnder interferometer having dual GTIs with plate beam splitters in accordance with one embodiment of the present invention.

FIG. 4 is a block diagram of a Mach-Zehnder interferometer having dual GTIs with plate beam splitters in accordance with one embodiment of the present invention. An optical filter 400 includes a first plate beam splitter 410a, a second plate beam splitter 410b, a GTI 1 420, a GTI 2 430, and a Mach-Zehnder controller 440. GTI 1 420 and GTI 2 430 replace two fold mirrors of a simple Mach-Zehnder interferometer. GTI 1 420 includes a GTI 1 front mirror 420a, a GTI 1 back mirror 420b and a GTI 1 controller 420c. GTI 2 430 includes a GTI 2 front mirror 430a, a GTI 2 back mirror 430b and a GTI 2 controller 430c. An input beam 460 from an input port incident on the first plate beam splitter 410a splits and travels to the GTI 1 420 and GTI 2 430. The beams from the GTI 1 420 and GTI 2 430 travel to the second plate beam splitter 410b and are re-combined to produce output beams—an output beam A 470a at a first output port and an output beam B 470b at a second output port. The optical filter 400 is sometimes referred to as a type of dual GTI Mach-Zehnder ("DGTIM") interferometer. Both the dual GTI Michelson interferometer and the dual GTI Mach-Zehnder interferometer are referred to as DGTIM interferometers.

$L_1$ is an optical path length of a first arm of the optical filter 400 (i.e., the sum of the optical path length from a reflection surface 415a of the first plate beam splitter 410a to the GTI 1 420 and the optical path length from the GTI 1 420 to a reflection surface 415b of the second plate beam splitter 410b). $L_2$ is an optical path length of a second arm of the optical filter 400 (i.e., the sum of the optical path length from the reflection surface 415a of the first plate beam splitter 410a to the GTI 2 430 and the optical path length from the GTI 2 430 to the reflection surface 415b of the second plate beam splitter 410b). An optical path difference ΔL is the difference between $L_1$ and $L_2$.

Figure 5:
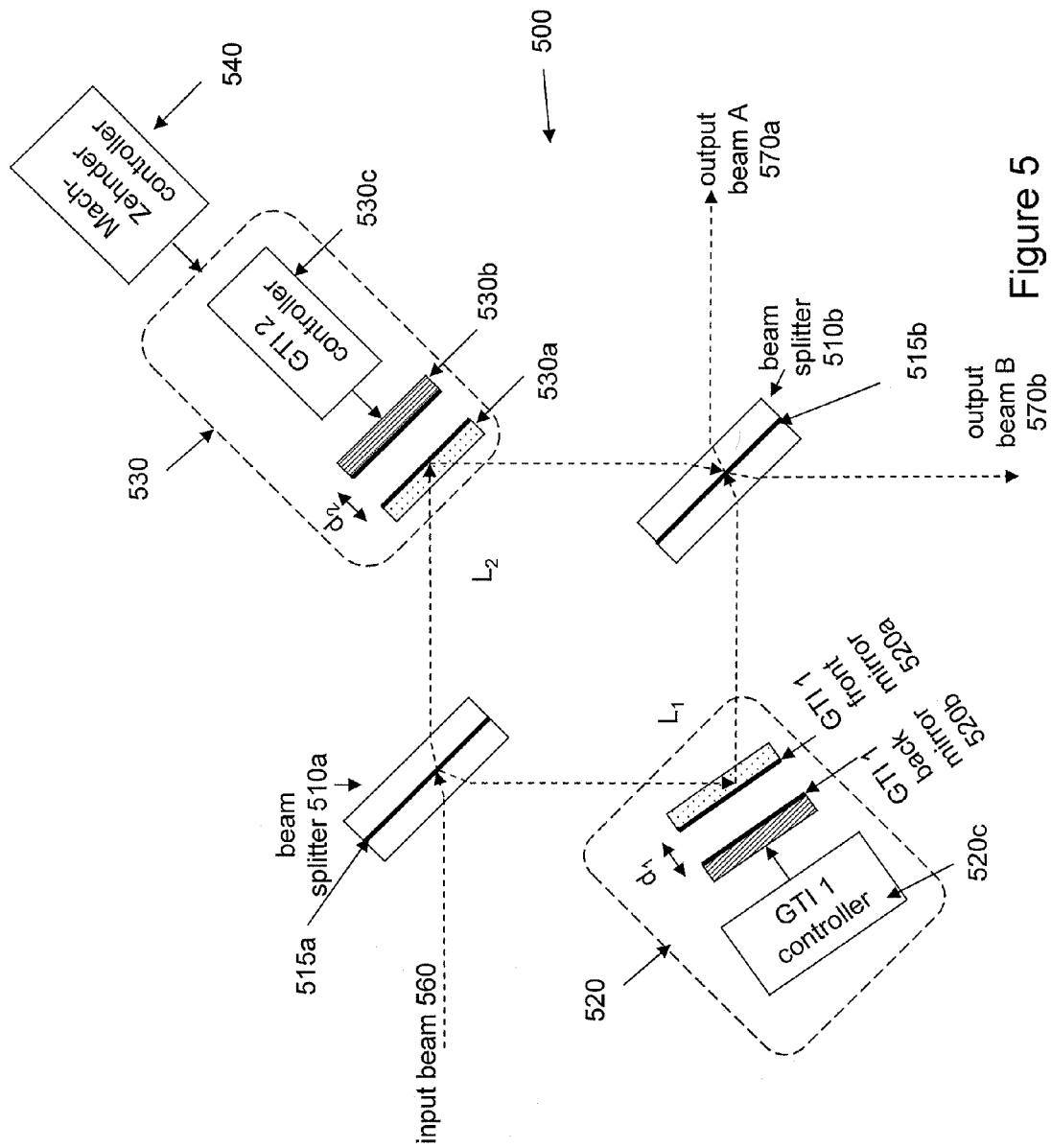
FIG. 5 is a block diagram of a Mach-Zehnder interferometer having dual GTIs with sandwich beam splitters in accordance with one embodiment of the present invention.

FIG. 5 is a block diagram of a Mach-Zehnder interferometer having dual GTIs with sandwich beam splitters in accordance with one embodiment of the present invention. An optical filter 500 includes a first sandwich beam splitter 510a, a second sandwich beam splitter 510b, a GTI 1 520, a GTI 2 530, and a Mach-Zehnder controller 540. GTI 1 520 and GTI 2 530 replace two fold mirrors of a simple Mach-Zehnder interferometer. GTI 1 520 includes a GTI 1 front mirror 520a, a GTI 1 back mirror 520b and a GTI 1 controller 520c. GTI 2 530 includes a GTI 2 front mirror 530a, a GTI 2 back mirror 530b and a GTI 2 controller 530c. An input beam 560 incident on the first sandwich beam splitter 510a splits and travels to the GTI 1 520 and GTI 2 530. The beams from the GTI 1 520 and GTI 2 530 travel to the second sandwich beam splitter 510b and are re-combined to produce output beams—an output beam A 570a at a first output port and an output beam B 570b at a second output port. The optical filter 500 is sometimes referred to as a type of dual GTI Mach-Zehnder ("DGTIM") interferometer.

$L_1$ is an optical path length of a first arm of the optical filter 500 (i.e., the sum of the optical path length from a reflection surface 515a of the first sandwich beam splitter 510a to the GTI 1 520 and the optical path length from the GTI 1 520 to a reflection surface 515b of the second sandwich beam splitter 510b). $L_2$ is an optical path length of a second arm of the optical filter 500 (i.e., the sum of the optical path length from the reflection surface 515a of the first sandwich beam splitter 510a to the GTI 2 530 and the optical path length from the GTI 2 530 to the reflection surface 515b of the second sandwich beam splitter 510b). An optical path difference ΔL is the difference between $L_1$ and $L_2$.

The filter characteristics of the output beam A 470a of FIG. 4 and the output beam A 570a of FIG. 5 are the same as the filter characteristics of the output beam 170 of FIG. 1. The filter characteristics of the output beam B 470b of FIG. 4 and the output beam B 570b of FIG. 5 are the same as the filter characteristics of the output beam 270 of FIG. 2 or are reciprocal of or complementary to the filter characteristics of the output beam 170 of FIG. 1. The filter characteristics of the output beam A 470a of FIG. 4 and the output beam A 570a of FIG. 5 are the same as the filter characteristics of output beam A 370a of FIG. 3. The filter characteristics of the output beam B 470b of FIG. 4 and the output beam B 570b of FIG. 5 are the same as the filter characteristics of output beam B 370b of FIG. 3.

Operation

According to one aspect, an optical filter has a sinusoidal filter function, which is periodic in frequency space (1/wavelength). An optical filter having a phase asymmetric beam splitter(s) (e.g., the optical filter 200 of FIG. 2, the optical filter 300 using the output port for the output beam B 370b of FIG. 3, the optical filter 400 using the output port for the output beam B 470b of FIG. 4, or the optical filter 500 using the output port for the output beam B 570b of FIG. 5) has the following filter function:

$$H = \frac{I_{Transmitted}}{I_{Incident}} = \sin^2\left(\frac{\phi}{2}\right) \quad (1.1)$$

An optical filter having a phase symmetric beam splitter (e.g., the optical filter 100 of FIG. 1, the optical filter 300 using the output port for the output beam A 370a of FIG. 3, the optical filter 400 using the output port for the output beam A 470a of FIG. 4, or the optical filter 500 using the output port for the output beam A 570a of FIG. 5) has the following filter function:

$$H = \cos^2\left(\frac{\phi}{2}\right) \quad (1.2)$$

The phase difference $\phi$ is shown as follows:

$$\phi = \phi_{arm\ 1} - \phi_{arm\ 2} \quad (1.3).$$

According to one aspect of the present invention, a sinusoidal filter function is not a desirable filter shape. A GTI, which has ideally a power reflectance of 1, can be used to modify the phase response of an arm of an optical filter, making the phase difference flattened or sharpened, depending on the application. According to one aspect of the present invention, the phase of each arm having a GTI can be expressed as follows:

$$\phi_{arm1} = 2\pi\frac{L_1}{\lambda} + \phi_{GTI1} = 2\pi\frac{L_1 f}{c} + \phi_{GTI1} \quad (1.4)$$

$$\phi_{arm2} = 2\pi\frac{L_2}{\lambda} + \phi_{GTI2} = 2\pi\frac{L_2 f}{c} + \phi_{GTI2} \quad (1.5)$$

$$\phi_{GTI1} = 2\arctan\left(\frac{1-\rho_1}{1+\rho_1}\tan\left(\frac{2\pi d_1}{\lambda}\right)\right) \quad (1.6)$$

$$\phi_{GTI2} = 2\arctan\left(\frac{1-\rho_2}{1+\rho_2}\tan\left(\frac{2\pi d_2}{\lambda}\right)\right) \quad (1.7)$$

where $L_1$ is a round-trip optical path length of a first arm of an optical filter having a Michelson interferometer (see, e.g., the descriptions with reference to FIGS. 1-3) or an optical path length between two beam splitters of a first arm of an optical filter having a Mach-Zehnder interferometer (see, e.g., the descriptions with reference to FIGS. 4-5).

$L_2$ is a round-trip optical path length of a second arm of an optical filter having a Michelson interferometer (see, e.g., the descriptions with reference to FIGS. 1-3) or an optical path length between two beam splitters of a second arm of an optical filter having a Mach-Zehnder interferometer (see, e.g., the descriptions with reference to FIGS. 4-5).

$\lambda$ is the wavelength of an input beam, and $f$ is the corresponding electro-magnetic frequency, where $f=c/\lambda$.

$\rho_1$ is the amplitude reflectivity of the front mirror of a first GTI.

$\rho_2$ is the amplitude reflectivity of the front mirror of a second GTI.

$\rho_1 = \sqrt{R_1}$, and $\rho_2 = \sqrt{R_2}$.

$d_1$ is the GTI spacing of a first GTI (i.e., the spacing between the front mirror and the back mirror of a first GTI).

$d_2$ is the GTI spacing of a second GTI (i.e., the spacing between the front mirror and the back mirror of the second GTI).

$\Delta L$ is an optical path difference and is $L_1 - L_2$.

$R_1$ is the power reflectance of the front mirror of a first GTI (the power reflectance of the back mirror of the first GTI is about 1).

$R_2$ is the power reflectance of the front mirror of a second GTI (the power reflectance of the back mirror of the second GTI is about 1).

The beam splitters are assumed to have about 50/50 reflectance/transmittance.

Fabry-Perot ("FP") Mode

According to one embodiment, an FP mode can be applied to any of the optical filters 100, 200, 300, 400 and 500, described above. In an FP mode, $\Delta L$ is set to zero. A filter shape is a function of the coherent combination of the light beams from the two arms of an optical filter. This allows the optical filter to create a filter that acts like a simple FP resonator.

For an FP mode, the parameters defining the structure of an optical filter (e.g., the optical filter 100, 200, 300, 400 or 500) are as follows:

$$\text{an optical path difference } \Delta L = L_1 - L_2 = 0, \quad (1.8)$$

$$d_1 = (2n_{GTI\,1} - 1)(\lambda_{target}/4), \text{ and} \quad (1.9)$$

$$d_2 = 0, \quad (1.10)$$

where $d_1$ is a GTI spacing between the front mirror and the back mirror of a first GTI, $d_2$ is a GTI spacing between the front mirror and the back mirror of a second GTI, $\lambda_{target}$ is a target wavelength, and $n_{GTI\,1}$, which is a GTI order, is an integer greater than zero. The equations (1.8), (1.9) and (1.10) are equivalent to the following and can be expressed as: $\Delta L = L_2 - L_1 = 0$; $d_1 = 0$; $d_2 = (2n_{GTI\,2} - 1)(\lambda_{target}/4)$.

A GTI having its GTI spacing set to zero behaves like a simple mirror. The other GTI having a GTI spacing greater than zero is set to resonance for the target wavelength. Although the ideal amplitude reflectivity of a GTI is flat, and unity through resonance, the phase response causes the coherent addition of the beams from the two arms of an optical filter to nearly replicate the filter shape of an FP resonator. The bandwidth of the filter is a function of $R_1$, and is slightly wider than a simple FP filter. For the first GTI order resonance (i.e., $n_{GTI\,1}=1$), the filter pass/reject is isolated in a bandwidth of an octave above (e.g., region A in FIG. 6) and an octave below (e.g., region B in FIG. 6) the target wavelength. As one uses higher and higher orders, the filter bandwidth (e.g., B in FIG. 7) grows geometrically narrower, but also the band (e.g., region A in FIG. 7) over which the filter pass/reject function is isolated grows geometrically narrower as well. A feature of implementing this type of filter in a DGTIM interferometer is that the two GTIs can be designed to have different values for $R_1$ and $R_2$. This allows the user to change the bandwidth properties of the filter, depending on whether GTI 1 or GTI 2 is used.

In a phase-symmetric optical filter (e.g., the optical filter 100 of FIG. 1, the optical filter 300 using the output port for the output beam A 370a of FIG. 3, the optical filter 400 using the output port for the output beam A 470a of FIG. 4, or the optical filter 500 using the output port for the output beam A 570a of FIG. 5), this can form the filter function of a simple FP resonator in reflection (i.e., a notch filter). The feature in this mode of operation is that the filter function of an FP resonator is accessible in an output port (e.g., the output port for the output beam 170 of the optical filter 100 in FIG. 1, the output port for the output beam A 370a of the optical filter 300 in FIG. 3, the output port for the output beam A 470a of the optical filter 400 in FIG. 4, or the output port for the output beam A 570a of the optical filter 500 in FIG. 5) which is independent of the input port for an input beam. In an ordinary FP, the reflection port is the same as the input port. This then requires an additional optical device for the simple FP filter, such as an isolator or circulator, to separate the input from output. These devices are typically polarization-sensitive, whereas the DGTIM interferometers of the present invention are polarization insensitive.

Figure 6:
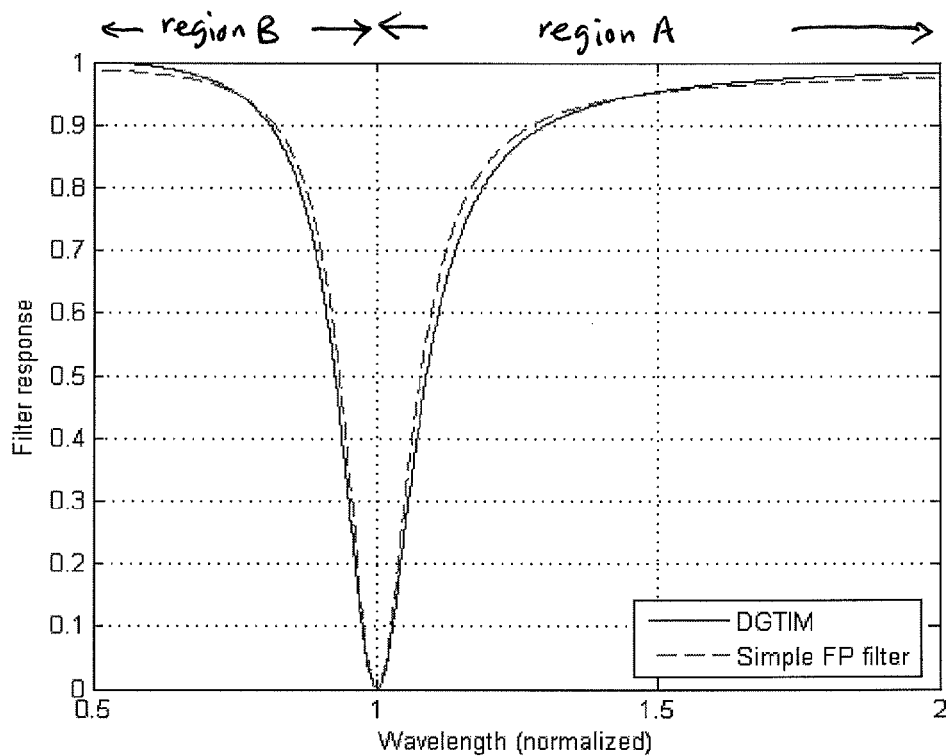
FIG. 6 shows an exemplary filter response of a phase-symmetric optical filter in accordance with one embodiment of the present invention and an exemplary filter response of a simple Fabry-Perot ("FP") filter.
Figure 7:
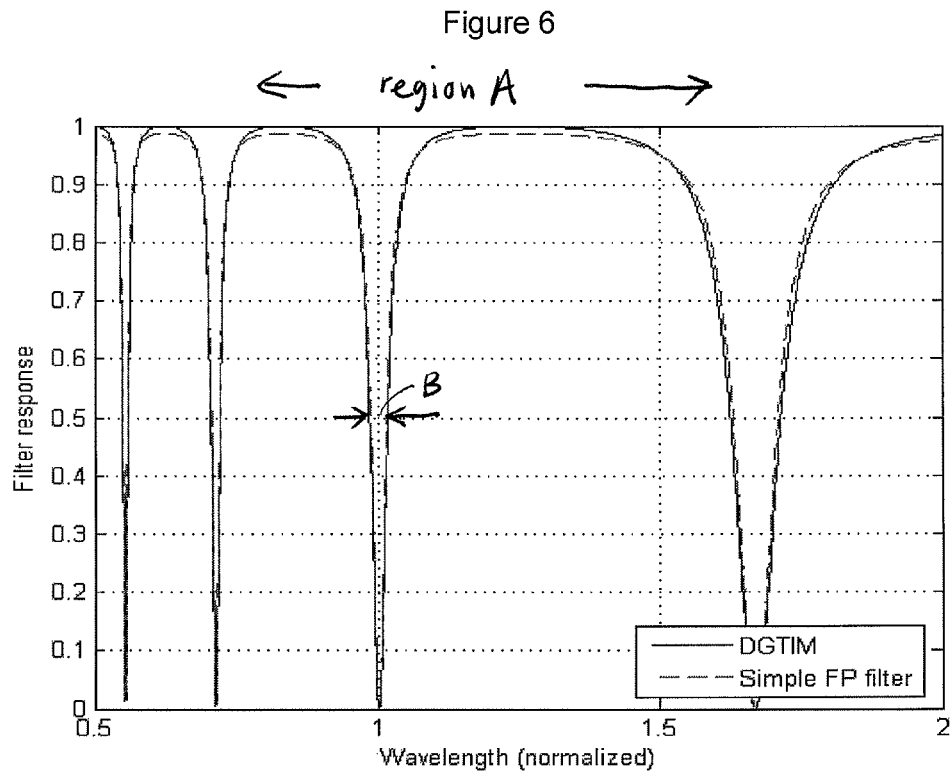
FIG. 7 shows another exemplary filter response of a phase-symmetric optical filter in accordance with one embodiment of the present invention and an exemplary filter response of a simple FP filter.

Exemplary filter functions of a phase-symmetric optical filter (e.g., an optical filter 100) are compared to that of a simple FP filter and are shown in FIGS. 6 and 7. In these figures, a phase-symmetric optical filter of the present invention is referred to as "DGTIM." The x-axis shows normalized wavelength (i.e., wavelength divided by the target wavelength). FIGS. 6 and 7 show exemplary filter responses of the output beam 170 of FIG. 1 (referred to as "DGTIM"). The output beam A 370a of FIG. 3, the output beam A 470a of FIG. 4, and the output beam A 570a of FIG. 5 show filter responses similar to the curve denoted as "DGTIM" in FIGS. 6 and 7. For a proper comparison, the mirror parameters of the simple FP filter are changed to maintain a similar finesse. Since the end mirror of a GTI has a power reflectance of 1, then the FP mirror power reflectances (assumed to be equal) need to be roughly $R_{GTI} = R_{FP}^2$. In this particular example shown in FIG. 6, $n_{GTI\,1}$ is 1, the power reflectance R for the front mirror of a GTI of an optical filter of the present invention is 0.6, and R for the simple FP filter is 0.8. In FIG. 7, $n_{GTI\,1}$ is 3, R for the front mirror of a GTI of an optical filter of the present invention is 0.6, and R for the simple FP filter is 0.8.

Figure 8:
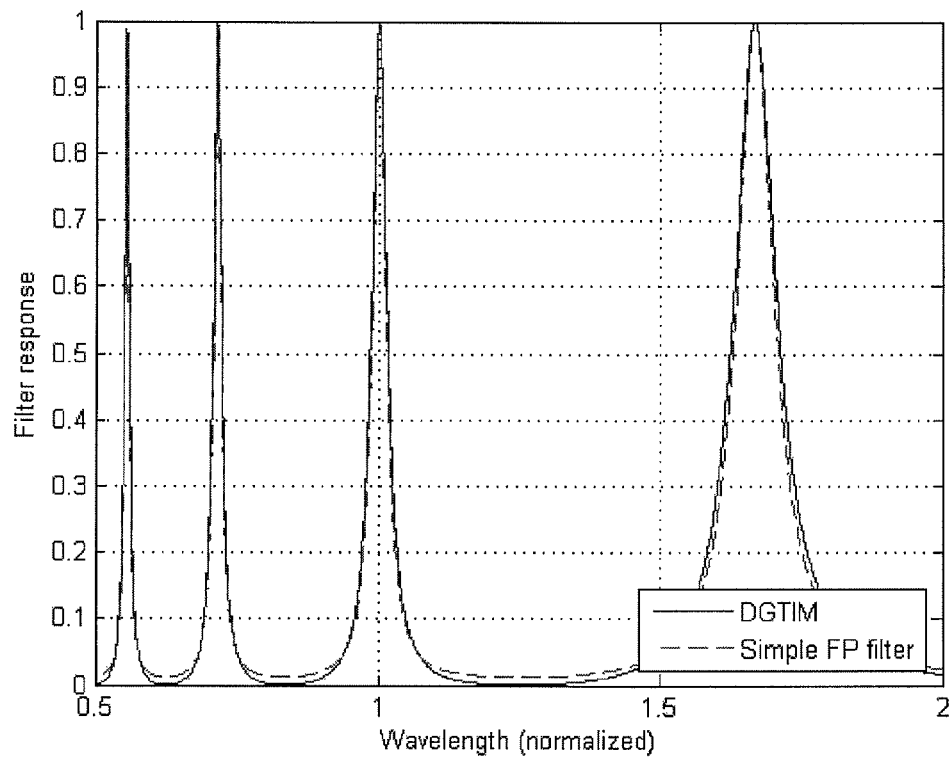
FIG. 8 shows an exemplary filter response of a phase-asymmetric optical filter in accordance with one embodiment of the present invention and an exemplary filter response of a simple FP filter.

An exemplary filter function of a phase-asymmetric optical filter (e.g., an optical filter 200) is compared to that of a simple FP filter and is shown in FIG. 8. FIG. 8 shows an exemplary filter response of the output beam 270 of FIG. 2 (referred to as "DGTIM"). In FIG. 8, $n_{GTI\,1}$ is 3, R for the front mirror of a GTI of an optical filter of the present invention is 0.6, and R for the simple FP filter is 0.8. The output beam B 370b of FIG. 3, the output beam B 470b of FIG. 4, and the output beam B 570b of FIG. 5 show filter responses similar to the curve denoted as "DGTIM" in FIG. 8.

Wideband, Low-Ripple FP Mode

According to one embodiment, a wideband, low-ripple FP mode can be applied to any of the optical filters 100, 200, 300, 400 and 500, described above. In a wideband, low-ripple FP mode, $\Delta L$ is set to zero. A filter shape is a function of the coherent combination of the light beams from the two arms of an optical filter. This allows the optical filter to create a filter that acts like a simple FP filter (or FP resonator) or to produce a bandwidth wider than that of a simple FP filter (or FP resonator).

For a wideband, low-ripple FP mode, the parameters defining the structure of an optical filter (e.g., the optical filter 100, 200, 300, 400 or 500) are as follows:

an optical path difference $\Delta L = L_1 - L_2 = 0$, $d_1 = (2n_{GTI\,1} - 1)(\lambda_{target\,1}/4)$, and $d_2 = (2n_{GTI\,2} - 1)(\lambda_{target\,2}/4)$, where $d_1$ is a GTI spacing between the front mirror and the back mirror of a first GTI, $d_2$ is a GTI spacing between the front mirror and the back mirror of a second GTI, $\lambda_{target\,1}$ is a target wavelength of a first GTI, and $n_{GTI\,1}$, which is a first GTI order, is an integer greater than zero, $\lambda_{target\,2}$ is a target wavelength of a second GTI, $n_{GTI\,2}$, which is a second GTI order, is an integer greater than zero, and $n_{GTI\,1}$ is either the same or different from $n_{GTI\,2}$.

According to one embodiment of the present invention, in a wideband, low-ripple FP mode, two GTIs are tuned to resonate at two different wavelengths that are close to each other. According to one embodiment, the power reflectances ("Rs") of the front mirrors of the two GTIs are the same. According to another embodiment, these reflectances are different. The coherent addition of the two filter functions generates a bandwidth wider than either a simple FP resonator or an FP mode of a DGTIM interferometer described above. It also results in a filter shape that is steeper than either a simple FP resonator or an FP mode of a DGTIM interferometer described above. In addition, the bandpass can be made very flat, with ripple well below <0.1%. Given the two resonant wavelengths of the two GTIs, the filter center wavelength is given by $$\lambda_{center} = 2\frac{\lambda_1 \lambda_2}{\lambda_1 + \lambda_2}.$$

Figure 9:
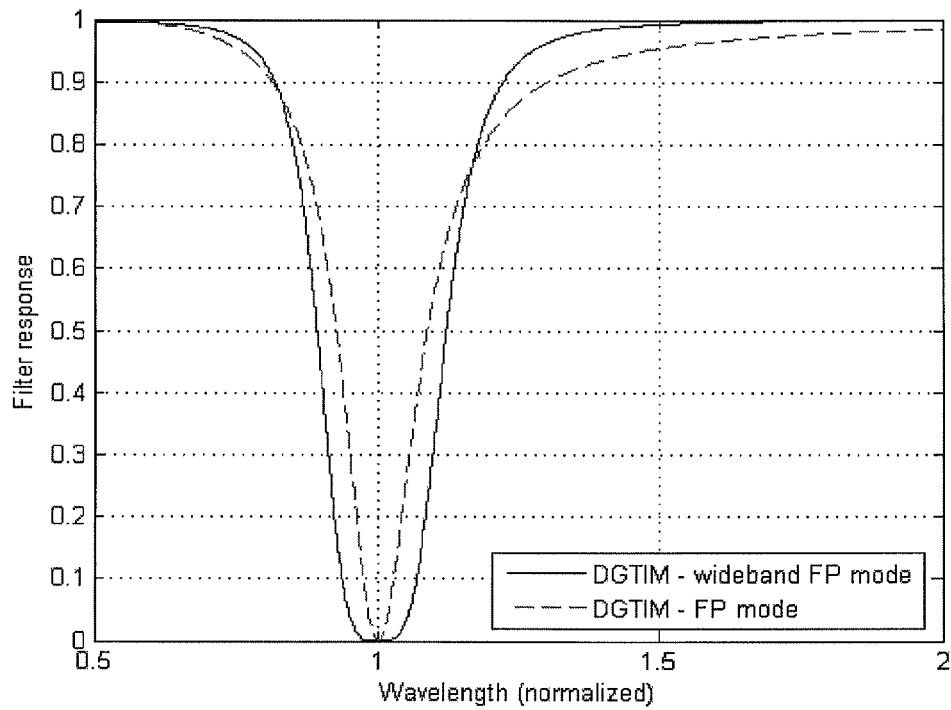
FIG. 9 shows exemplary filter responses for a phase-symmetric optical filter in a wideband, low-ripple FP mode (referred to as "DGTIM—wideband FP mode") and a phase-symmetric optical filter in an FP mode (referred to as "DGTIM—FP mode") in accordance with one embodiment of the present invention.

The bandwidth is a function of the front mirror power reflectances of the GTIs and the separation of the two wavelengths (or the allowable ripple in the bandpass). Similar to the FP mode, for a phase-symmetric optical filter, the filter will be a notch, and for a phase-asymmetric optical filter (e.g., the optical filter 200 in FIG. 2), the filter will be a bandpass. FIG. 9 shows exemplary filter responses for a phase-symmetric optical filter of the present invention in a wideband, low-ripple FP mode (referred to as "DGTIM—wideband FP mode") and a phase-symmetric optical filter of the present invention in an FP mode (referred to as "DGTIM—FP mode"). In this example, the power reflectances ("Rs") of the front mirrors of the GTIs are 0.6. The GTI resonant wavelengths are set so that the bandpass ripple is less than $10^{-5}$ (over roughly 1% of the normalized wavelength).

Narrowband Notch/Bandpass Mode

According to one embodiment, a narrowband notch/bandpass mode can be applied to any of the optical filters 100, 200, 300, 400 and 500, described above. According to certain aspects of the present invention, in a narrowband notch/bandpass mode, the GTI phase response is used to modify a simple Michelson or Mach-Zehnder interferometer filter response. This produces a filter response that is either wider and more flat-topped, or narrower and sharper than a response attainable with a simple Michelson or Mach-Zehnder interferometer. According to one aspect, only one GTI is used to modify the Michelson or Mach-Zehnder interferometer filter response. According to another aspect, a second GTI has a front mirror power reflectance that is different from the front mirror power reflectance of the first GTI, which gives the user more flexibility in designing a versatile and tunable filter.

The width of a simple Michelson or Mach-Zehnder interferometer filter response is a function of how quickly the phase difference of the two arms of the filter changes as a function of wavelength or frequency. A simple Michelson or Mach-Zehnder interferometer can produce narrow filters, however, at the expense of a large Michelson or Mach-Zehnder delay (or a large optical path difference $\Delta L$). At large $\Delta L$, however, adjacent notches are very close to the target wavelength. To help isolate a notch or bandpass, the phase response of the GTI can be used to speed up the rate of change of phase around a target wavelength of interest, while still keeping other bandpass far from the bandwidth of interest. The resulting notch or bandpass is narrower and sharper than that of a simple Michelson or Mach-Zehnder interferometer.

Figure 10:
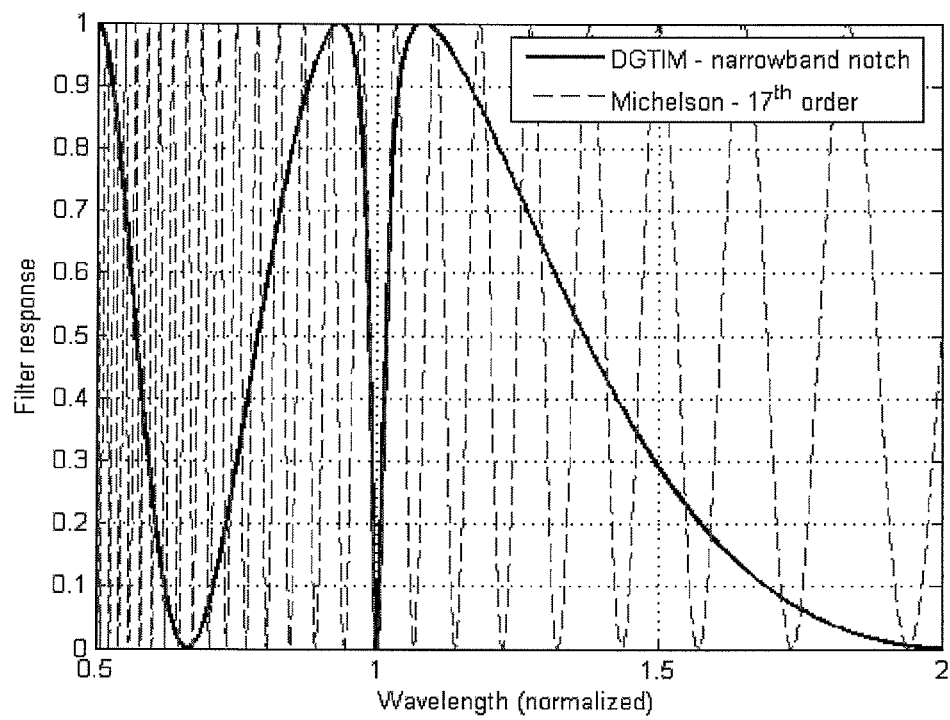
FIG. 10 shows an exemplary filter response of a phase-symmetric optical filter in a narrowband notch mode in accordance with one embodiment of the present invention and an exemplary filter response of a 17th order Michelson interferometer.

FIG. 10 shows an exemplary filter response of a phase-symmetric optical filter (e.g., the optical filter 100 of FIG. 1, the optical filter 300 using the output port for the output beam A 370a of FIG. 3, the optical filter 400 using the output port for the output beam A 470a of FIG. 4, or the optical filter 500 using the output port for the output beam A 570a of FIG. 5) in a narrowband notch mode and an exemplary filter response of a 17th order Michelson interferometer. The curve referred to as "DGTIM—narrowband notch" is an exemplary filter response of the output beam 170 of FIG. 1, where the GTI front mirror power reflectance R is 0.9. The output beam A 370a of FIG. 3, the output beam A 470a of FIG. 4, and the output beam A 570a of FIG. 5 have filter responses similar to the curve referred to as "DGTIM—narrowband notch" in FIG. 10.

For a narrowband notch mode, the parameters defining the structure of an optical filter (e.g., the optical filter 100 of FIG. 1, the optical filter 300 using the output port for the output beam A 370a of FIG. 3, the optical filter 400 using the output port for the output beam A 470a of FIG. 4, or the optical filter 500 using the output port for the output beam A 570a of FIG. 5) are as follows:

an optical path difference $\Delta L = L_1 - L_2 = 2n_M(\lambda_{target\,1}/2)$, $d_1 = (2n_{GTI\,1} - 1)(\lambda_{target\,1}/4)$, and $d_2 = 0$ where $d_1$ is a GTI spacing between the front mirror and the back mirror of a first GTI, $d_2$ is a GTI spacing between the front mirror and the back mirror of a second GTI, $\lambda_{target\,1}$ is a target wavelength, $n_M$ is an integer greater than zero, and $n_{GTI\,1}$ is an integer greater than zero. $n_{GTI\,1}$ is sometimes referred to as a GTI order, and $n_M$ is sometimes referred to as a Michelson or Mach-Zehnder order.

According to one embodiment of the present invention, a bandpass is formed by either a) designing a filter around a phase-asymmetric Michelson interferometer (see, e.g., FIG. 2), b) designing a filter around an off-axis phase-symmetric Michelson interferometer (see, e.g., FIG. 3), or c) designing a filter around a phase-symmetric Michelson or Mach-Zehnder interferometer (see, e.g., FIGS. 1, 4 and 5). Although not equivalent, a bandpass can be formed also by simply shifting $\Delta L$ by a half wave, $\Delta L = (2n_M - 1)(\lambda_{target}/2)$. An exemplary bandpass (referred to as "DGTIM—narrowband bandpass") and the curve "DGTIM—narrowband notch" from FIG. 10 are shown together in FIG. 11.

Figure 11:
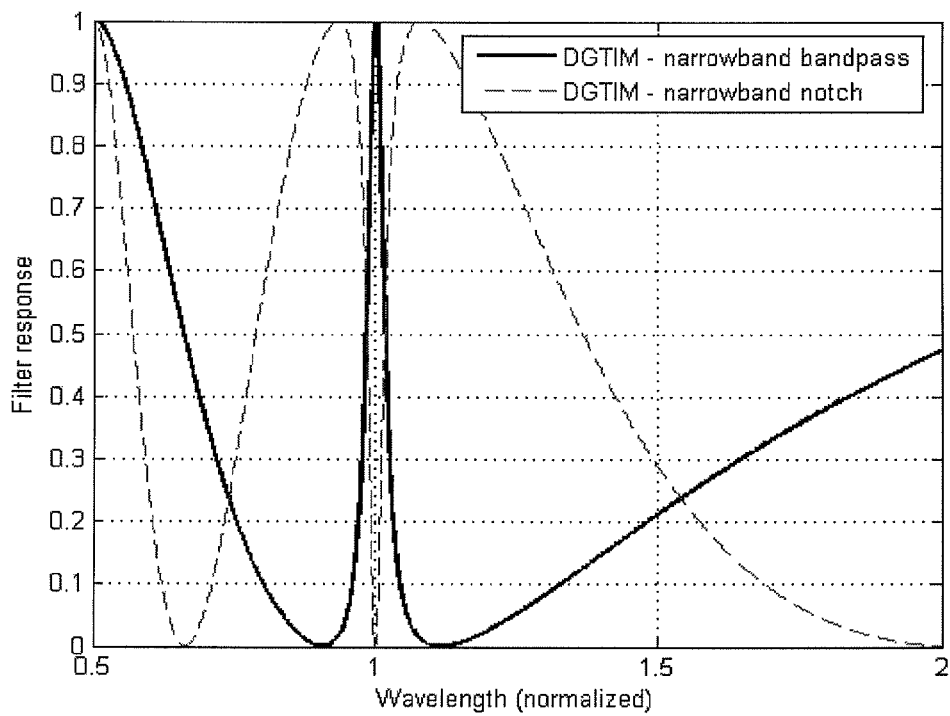
FIG. 11 shows an exemplary filter response of a phase-asymmetric optical filter in a narrowband bandpass mode (referred to as "DGTIM—narrowband bandpass") in accordance with one embodiment of the present invention and the exemplary filter response of the phase-symmetric optical filter in a narrowband notch mode shown in FIG. 10 (referred to as "DGTIM—narrowband notch").

In FIG. 11, the curve referred to as "DGTIM—narrowband bandpass" is an exemplary filter response of the output beam 270 of FIG. 2, where the GTI front mirror power reflectance R is 0.9. The output beam B 370b of FIG. 3, the output beam B 470b of FIG. 4, and the output beam B 570b of FIG. 5 have filter responses similar to the curve referred to as "DGTIM—narrowband bandpass" in FIG. 11.

For a narrowband bandpass mode, the parameters defining the structure of an optical filter (e.g., the optical filter 200 of FIG. 2, the optical filter 300 using the output port for the output beam B 370b of FIG. 3, the optical filter 400 using the output port for the output beam B 470b of FIG. 4, or the optical filter 500 using the output port for the output beam B 570b of FIG. 5) are as follows:

an optical path difference $\Delta L = L_1 - L_2 = (2n_M - 1)(\lambda_{target\ 1}/2)$, $d_1 = (2n_{GTI\ 1} - 1)(\lambda_{target\ 1}/4)$, and $d_2 = 0$, where $d_1$ is a GTI spacing between the front mirror and the back mirror of a first GTI, $d_2$ is a GTI spacing between the front mirror and the back mirror of a second GTI, $\lambda_{target\ 1}$ is a target wavelength, $n_M$ is an integer greater than zero, and $n_{GTI\ 1}$ is an integer greater than zero. $n_{GTI\ 1}$ is sometimes referred to as a GTI order, and $n_M$ is sometimes referred to as a Michelson or Mach-Zehnder order. Typically, the higher the order, the narrower the resulting bandwidth.

Wideband Notch/Bandpass Mode

According to one embodiment, a wideband notch/bandpass mode can be applied to any of the optical filters 100, 200, 300, 400 and 500, described above. According to certain aspects of the present invention, in a wideband notch/bandpass mode, the GTI phase response is used to modify a simple Michelson or Mach-Zehnder interferometer filter response. This produces a filter response that is either wider and more flat-topped, or narrower and sharper than a response attainable with a simple Michelson or Mach-Zehnder interferometer. According to one aspect, only one GTI is used to modify the Michelson or Mach-Zehnder interferometer filter response. According to another aspect, a second GTI has a front mirror power reflectance that is different from the front mirror power reflectance of the first GTI, which gives the user more flexibility in designing a versatile and tunable filter.

Figure 12:
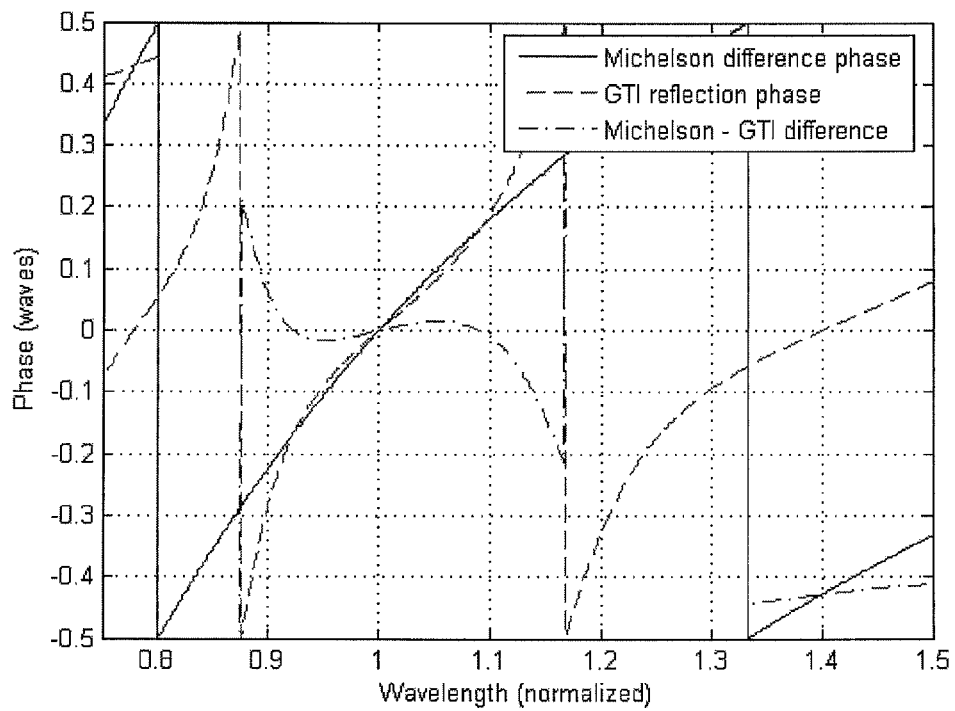
FIG. 12 shows the rate of change of phase for a Michelson interferometer, a GTI, and what happens when the two are subtracted (by including a GTI in an arm of a Michelson interferometer) in accordance with one embodiment of the present invention.

For a narrowband condition, it is desirable to cause the phase to change rapidly around the target wavelength of interest. For a wideband condition, it is desirable to cause the phase to vary slowly around the target wavelength. In this wideband condition, the anti-resonant part of the GTI phase response is used to "cancel" the slope of the Michelson phase response around the target wavelength according to one embodiment of the present invention. This is shown in FIG. 12. In another embodiment, the anti-resonant part of the GTI phase response is used to "cancel" the slope of the Mach-Zehnder phase response around the target wavelength. It should be noted that this is a sensitive function of not only the GTI spacing d but also the GTI front mirror power reflectance R. Typically higher values of R will generate either higher ripple or narrower bandwidths, so the value used needs to be traded against system requirements.

FIG. 12 demonstrates the rate of change of phase for a Michelson interferometer, a GTI, and what happens when the two are subtracted (by including a GTI in an arm of a Michelson interferometer). The phase response flattens around the target wavelength, which in turn flattens the wavelength response of a DGTIM interferometer.

Figure 13:
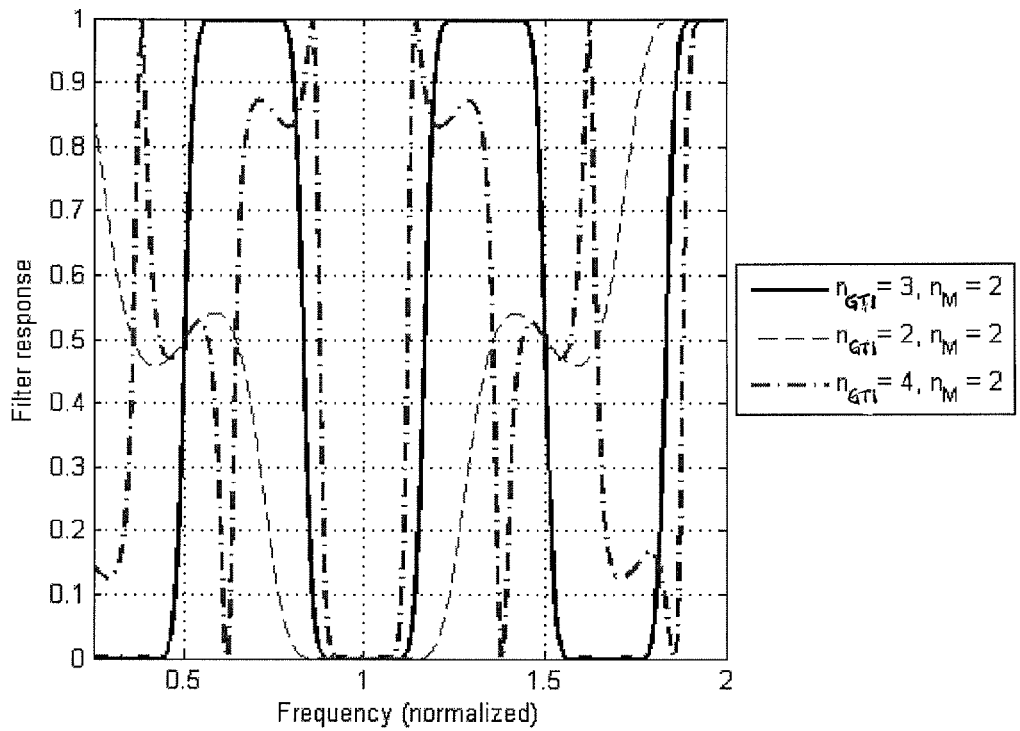
FIG. 13 shows three realizations of a wideband notch, using different GTI orders in accordance with one embodiment of the present invention.

FIG. 13 shows three realizations of a wideband notch, using different GTI orders. The x-axis is in normalized frequency units, inversely proportional to wavelength. For all values where a GTI spacing $d = \Delta L$, the filter shape is very clean and square. Lower values of $n_{GTI}$ stretch the width of the filter, while higher values of $n_{GTI}$ narrow it.

Figure 14:
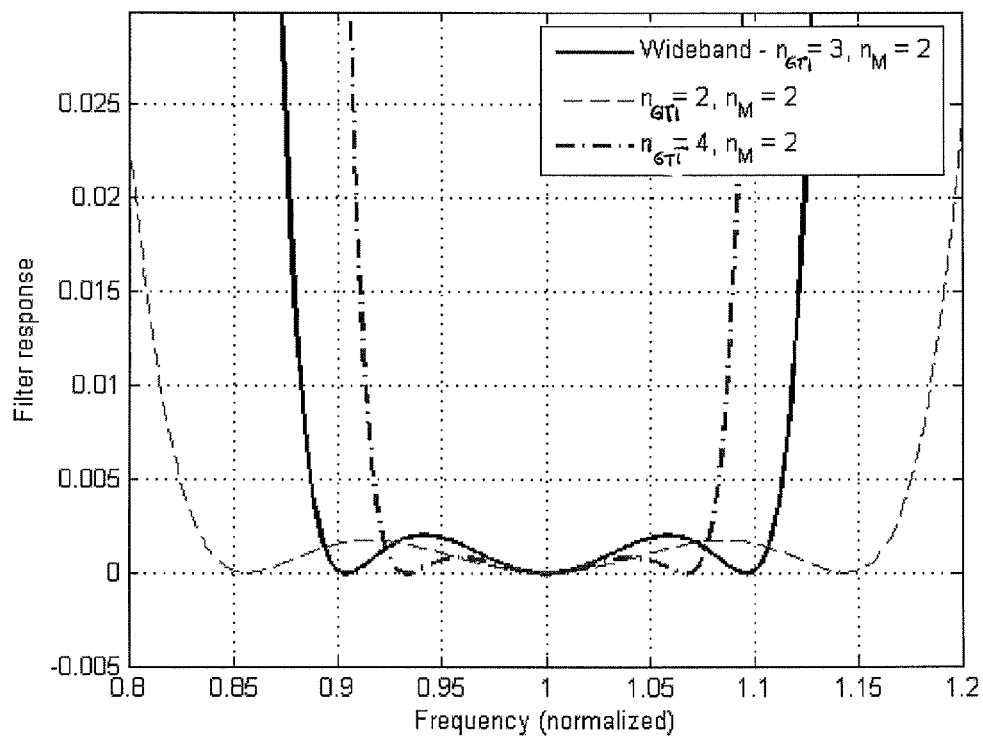
FIG. 14 shows how the ripple in a notch can be made small in accordance with one embodiment of the present invention.

The ripple in the notch (or equivalently the bandpass for the complementary filter) can be made very small, as shown in FIG. 14. This is both a function of the power reflectance R of a GTI which is being used (i.e., the GTI whose spacing d is not equal to zero), and the order of the Michelson (or Mach-Zehnder) as well as GTI (i.e., $n_M$ and $n_{GTI}$).

For a wideband notch mode, the parameters defining the structure of an optical filter (e.g., the optical filter 100 of FIG. 1, the optical filter 300 using the output port for the output beam A 370a of FIG. 3, the optical filter 400 using the output port for the output beam A 470a of FIG. 4, or the optical filter 500 using the output port for the output beam A 570a of FIG. 5) are as follows:

$\Delta L = L_1 - L_2 = (2n_M - 1)(\lambda_{target\ 1}/2)$, $d_1 = 2n_{GTI\ 1}(\lambda_{target\ 1}/4)$, and $d_2 = 0$, where $d_1$ is a GTI spacing between the front mirror and the back mirror of a first GTI, $d_2$ is a GTI spacing between the front mirror and the back mirror of a second GTI, $\lambda_{target\ 1}$ is a target wavelength. $n_M$, which is a Michelson or mach-Zehnder order, is an integer greater than zero, and $n_{GTI\ 1}$, which is a GTI spacing order, is an integer greater than zero.

Figure 15:
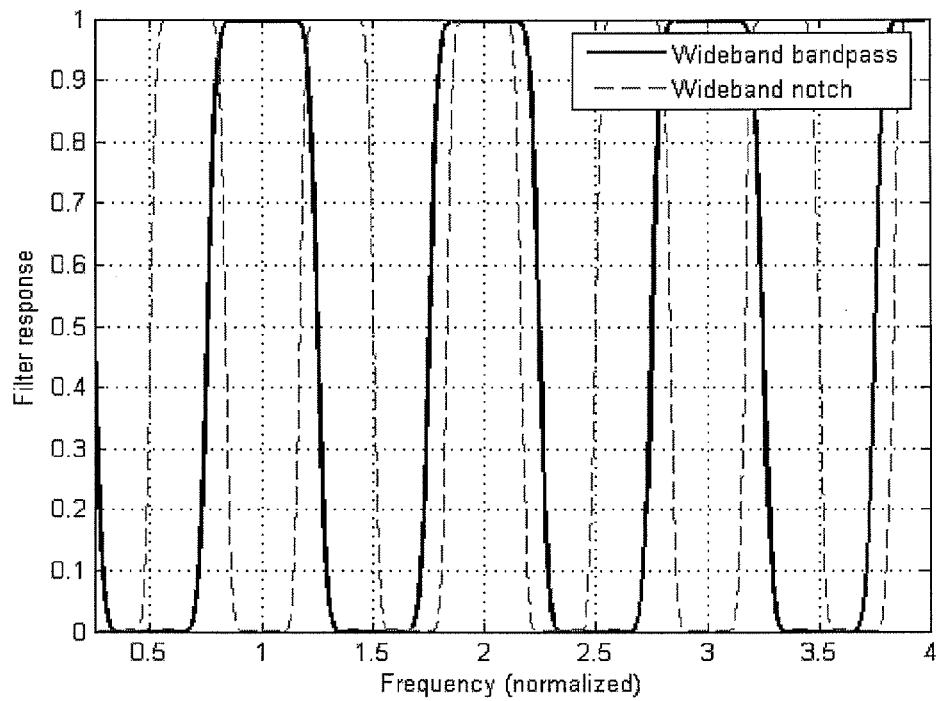
FIG. 15 shows an exemplary filter response of an optical filter in a wideband bandpass mode in accordance with one embodiment of the present invention as compared to the exemplary filter response of an optical filter in a wideband notch mode shown in FIG. 13.

According to one embodiment of the present invention, a bandpass is formed by either a) designing a filter around a phase-asymmetric Michelson interferometer (see, e.g., FIG. 2), b) designing a filter around an off-axis phase-symmetric Michelson interferometer (see, e.g., FIG. 3), or c) designing a filter around a phase-symmetric Michelson or Mach-Zehnder interferometer (see, e.g., FIGS. 1, 4 and 5). A similar, but not equivalent, bandpass can also be achieved by shifting $\Delta L$ by a half wave, as shown in FIG. 15. For this condition, the optical path difference $\Delta L = 2n_M(\lambda_{target\ 1}/2)$.

FIG. 15 shows an exemplary filter response of an optical filter (e.g., the optical filter 200 in FIG. 2) in a wideband bandpass mode as compared to the exemplary filter response of an optical filter in a wideband notch mode shown in FIG. 13. In FIG. 15, the filter shape for the wideband bandpass mode is not as sharp as that for the wideband notch mode. For the wideband bandpass, $n_{GTI\ 1} = 2$, and $n_M = 1$. For the wideband notch, $n_{GTI\ 1} = 2$, and $n_M = 2$. This implies the same relationship ($d = \Delta L$) to obtain a filter shape that is clean and square-shaped, without significant features and low ripple.

For a wideband bandpass mode, the parameters defining the structure of an optical filter (e.g., the optical filter 200 of FIG. 2, the optical filter 300 using the output port for the output beam B 370b of FIG. 3, the optical filter 400 using the output port for the output beam B 470b of FIG. 4, or the optical filter 500 using the output port for the output beam B 570b of FIG. 5) are as follows:

$\Delta L = L_1 - L_2 = 2n_M(\lambda_{target\ 1}/2)$, $d_1 = 2n_{GTI\ 1}(\lambda_{target\ 1}/4)$, and $d_2 = 0$, where $d_1$ is a GTI spacing between the front mirror and the back mirror of a first GTI, $d_2$ is a GTI spacing between the front mirror and the back mirror of a second GTI, $\lambda_{target\ 1}$ is a target wavelength. $n_M$, which is a Michelson or mach-Zehnder order, is an integer greater than zero, and $n_{GTI\ 1}$, which is a GTI spacing order, is an integer greater than zero.

It should also be noted that in comparing the narrowband and wideband parameters, for wideband operation, typically low power reflectances for the GTI front mirror are desirable, whereas for narrowband operation, high power reflectances for the GTI front mirror are desirable. According to one embodiment, in a narrowband notch/bandpass mode and a wideband notch/bandpass mode, because only one GTI is used at a time (i.e., the spacing d of one GTI is not equal to zero), one of the GTIs can be designed for wideband operation, while the second one of the GTIs is designed for narrowband operation.

According to certain aspects of the present invention, in an FP mode, a wideband, low-ripple FP mode, a narrowband notch/bandpass mode, and a wideband notch/bandpass mode described above, the first GTI can be one of GTI 1 or GTI 2 of the optical filter 100, 200, 300, 400 or 500 in FIGS. 1-5, and the second GTI can be the other one of GTI 1 or GTI 2 of the optical filter 100, 200, 300, 400 or 500 in FIGS. 1-5. $L_1$ can be one of $L_1$ or $L_2$ described above with reference to FIGS. 1-5. $L_2$ can be the other one of $L_1$ or $L_2$ described above with reference to FIGS. 1-5.

According to one aspect of the present invention, by replacing two end mirrors of the Michelson interferometer or the fold minors of the Mach-Zehnder interferometer with GTIs, the phase dispersion of the interferometer can be tuned to spectrally modify the output of the interferometer. This solution primarily uses the reflection phase characteristics of the GTIs in conjunction with the optical path length phase of the Michelson or Mach-Zehnder interferometer. The phase dispersion can be tuned by a combination of GTI spacing and the optical path difference. This tuning can be done dynamically by controlling optical path lengths appropriately.

While the present invention has been particularly described with reference to the various figures and embodiments, it should be understood that these are for illustration purposes only and should not be taken as limiting the scope of the invention. There may be many other ways to implement the invention. Many changes and modifications may be made to the invention, by one having ordinary skill in the art, without departing from the spirit and scope of the invention. For example, GTI 1 and GTI 2 can be interchanged, $L_1$ and $L_2$ can be interchanged, and $d_1$ and $d_2$ can be interchanged. Furthermore, the present invention is not limited to the specific Michelson and Mach-Zehnder configurations described herein.

What is claimed is:

1. An optical filter comprising a Michelson interferometer or a Mach-Zehnder interferometer having a first optical path length $L_1$ and a second optical path length $L_2$, the Michelson interferometer or the Mach-Zehnder interferometer further having a plurality of Gires-Tournois interferometers ("GTIs") replacing a plurality of minors of the Michelson interferometer or the Mach-Zehnder interferometer, a first one of the plurality of GTIs having a first GTI spacing $d_1$, a second one of the plurality of GTIs having a second GTI spacing $d_2$, and an optical path difference $\Delta L = L_1 - L_2$, wherein $\Delta L = (2n_M - 1)(\lambda_{target\ 1}/2)$ or $\Delta L = 2n_M(\lambda_{target\ 1}/2)$, $d_1 = 2n_{GTI\ 1}(\lambda_{target\ 1}/4)$, and $d_2 = 0$, wherein $\lambda_{target\ 1}$ is a target wavelength, $n_M$ is an integer greater than zero, and $n_{GTI\ 1}$ is an integer greater than zero.

2. An optical filter of claim 1, wherein a power reflectance of a front mirror of the first one of the plurality of GTIs is different from a power reflectance of a front mirror of the second one of the plurality of GTIs.

3. An optical filter of claim 1, wherein the optical filter is a phase-symmetric optical filter, the optical filter including a plurality of sandwich beam splitters.

4. An optical filter of claim 1, wherein the optical filter includes an off-axis beam splitter, an input port and a plurality of output ports.

5. An optical filter of claim 1, wherein a filter function $H = \sin^2(\phi/2)$ or $H = \cos^2(\phi/2)$, a phase difference $\phi = \phi_{arm\ 1} - \phi_{arm\ 2}$, $\phi_{arm\ 1} = 2\pi L_1/\lambda + \phi_{GTI\ 1}$, $\phi_{arm\ 2} = 2\pi L_2/\lambda + \phi_{GTI\ 2}$, $\phi_{GTI\ 1} = 2\arctan(1-\rho_1/1+\rho_1 \tan(2\pi d_1/\lambda))$, $\phi_{GTI\ 2} = 2\arctan(1-\rho_2/1+\rho_2\tan(2\pi d_2/\lambda))$, $\lambda$ is a wavelength of an input beam, $\rho_1$ is an amplitude reflectivity of a mirror of the first one of the plurality of GTIs, and $\rho_2$ is an amplitude reflectivity of a mirror of the second one of the plurality of GTIs.

* * * * *

UNITED STATES PATENT AND TRADEMARK OFFICE
CERTIFICATE OF CORRECTION

| | | |
|---|---|---|
| PATENT NO. | : 7,880,968 B1 | Page 1 of 1 |
| APPLICATION NO. | : 12/695117 | |
| DATED | : February 1, 2011 | |
| INVENTOR(S) | : Christopher W. Tischhauser et al. | |

It is certified that error appears in the above-identified patent and that said Letters Patent is hereby corrected as shown below:

On the Title Page, Item (57)

IN THE ABSTRACT:

Line 10: Replace "minors", with -- mirrors --

IN THE CLAIMS:

Column 16, Line 7: Replace "minors", with -- mirrors --

Signed and Sealed this
Fourth Day of October, 2011

David J. Kappos
*Director of the United States Patent and Trademark Office*